United States Patent [19]

Lubarsky, Jr. et al.

[11] 3,778,704

[45] Dec. 11, 1973

[54] TECHNIQUE FOR DIRECTLY MEASURING A SIGNAL-TO-NOISE RATIO OF A COMMUNICATION CIRCUIT

[75] Inventors: Andre Lubarsky, Jr., Sunnyvale; Charles M. Volkland, Los Altos, both of Calif.

[73] Assignee: Telecommunications Technology, Inc., Sunnyvale, Calif.

[22] Filed: Apr. 2, 1973

[21] Appl. No.: 346,778

[52] U.S. Cl. .......... 324/57 R

[51] Int. Cl. .......... G01r 27/00

[58] Field of Search .......... 324/57 R, 140 D; 325/363; 328/134

[56] References Cited

UNITED STATES PATENTS 3,122,704 2/1964 Jones .......... 328/134 X 3,737,781 6/1973 Deerkoski .......... 325/363

*Primary Examiner*—Alfred E. Smith

*Attorney*—Karl A. Limbach et al.

[57] ABSTRACT

A method and apparatus for determining the signal-to-noise characteristic of a communication circuit by first forming a cumulative phase jitter function whose amplitude is proportional to a ratio between magnitudes of a dominant signal and all interfering signals. This phase jitter function is detected by a true r.m.s. detector and a DC output level of the detector is proportional to the signal-to-noise ratio of a communication circuit through which the test signal has been passed.

12 Claims, 8 Drawing Figures

TECHNIQUE FOR DIRECTLY MEASURING A SIGNAL-TO-NOISE RATIO OF A COMMUNICATION CIRCUIT

BACKGROUND OF THE INVENTION

This invention relates generally to techniques for measuring the quality of an electronic communication system, and more particularly relates to techniques for measuring the degree of unwanted "noise" imparted by a communication system to a desired signal passing therethrough. By "noise" as used herein is meant white noise, phase jitter, harmonic distortion, intermodulation distortion, etc.

The type of communication circuits provided by telephone companies have in recent years been utilized for the transmission of high speed data. For voice signals and low speed data, a communication circuit of poor quality is often not a significant problem. But with data sets operating at 4800 and 9600 bits per second, the quality of such a communication circuit becomes very important. Phase jitter is a symptom of poor quality in a communication circuit. In its simplest terms, phase jitter may be viewed as a disturbance in the periodicity of the zero crossings of the signal. That is, if a single frequency test signal is applied at one end of a communication circuit, the phase jitter imparted to this signal may be determined by observing at the output of the communication circuit a disturbance in the periodicity of the zero crossings of the output signal.

A copending patent application, Ser. No. 205,242, filed Dec. 6, 1971 and now U.S. Pat. No. 3,737,766 by Andre Lubarsky, Jr., and assigned to the assignee of the present invention, pertains to various techniques of measuring phase jitter and the determination of the quality of transmission through a communication circuit. With reference to FIGS. 3 and 7 of said copending application, a technique for measuring total peak-to-peak phase jitter is described. A cumulative phase jitter signal as shown in FIG. 2K of said copending application is developed in the course of determining peak-to-peak phase jitter. This cumulative phase jitter signal is moved up or down in amplitude an increment each one-half cycle of the test signal received at the output of the communication circuit depending upon whether the time duration of the one-half cycle is greater than or less than, respectively, an average one-half cycle time duration. The average one-half cycle time duration is derived from the signal at the output of the communication circuit but is substantially the same as one-half the period of a sinusoidal test signal inserted into the input of the communication circuit. A phase jitter test set, Model TTI 1200, manufactured by the assignee of the present invention, incorporates such a peak-to-peak phase jitter determination. The quantity desired by the techniques of said copending application is the maximum amplitude swing of the aforementioned cumulative phase jitter signal as an indication of the peak-to-peak phase jitter in degrees of the communication system.

It is a primary object of the present invention to provide an improved technique for directly measuring a signal-to-noise ratio on a commmunication circuit.

It is another object of the present invention to provide an improved technique for measuring harmonic distortion on a communication circuit.

It is also an object of the present invention to provide a simple technique of measuring the dynamic frequency response of a communication circuit, especially a telephone circuit that includes variable gain devices such as compandors.

SUMMARY OF THE INVENTION

These and additional objects are accomplished according to the techniques of the present invention wherein a cumulative phase jitter signal is developed in a manner summarized hereinabove, and the r.m.s. (root-mean-square) value of that time varying signal is obtained as a direct current output of an appropriate detector. This direct current signal is related directly to the signal-to-noise characteristics of the communication circuit when a test signal is passed therethrough and observed at the output of the communication circuit. In order to place this direct current signal into a form that is conventional for direct observation, it is applied to an inverse log converter and the output of the inverse log converter is displayed in some convenient manner. The display gives the signal-to-noise ratio in decibels (db.) directly.

This particular technique of signal-to-noise measurement has the advantage that the carrier (that is, the component of the output signal at the input test signal frequency) and its harmonics are suppressed from the measurement without any special effort. Although a high pass filter is preferred in order to control the frequency range of suppression, no elaborate notching filter systems, as presently required in existing noise measuring devices, are required. The result is that the frequencies suppressed can be controlled to a very narrow bandwidth.

Since all of the harmonics of the carrier are also suppressed by this technique, harmonic distortion of the communication system will not oridinarily be detected as part of the noise measurement. In order to permit detection of harmonics, a signal may be passed through an input network which includes a modulator that receives the output signal of the communication circuit under examination. This signal is modulated upward in frequency and then demodulated back down in amounts so that the resulting signal and its harmonics that are analyzed is displaced a small incremental frequency from the output frequency of the communication circuit under examination. The result of this is to shift in frequency by this incremental amount the input signal and harmonics whose phase jitter is being detected while shifting the harmonic notches of the testing apparatus a different amount so that they do not exclude harmonics of the carrier frequency. Such an input circuit is preferably included as part of the test instrument with the added capability of switching it into and out of the signal path at will for the purpose of measuring harmonic distortion. A technician can then observe the signal-to-noise output reading of the test instrument both with and without this frequency shifting input circuit used, thereby to determine that portion of the measured noise that is generated by harmonic distortion of the carrier test signal being passed through the communication circuit.

The techniques of the present invention provide for measuring those characteristics of a communication circuit that affect the periodicity of the zero crossings of a single frequency carrier test signal passed therethrough. Such factors that affect the zero crossings include random noise, single frequency interference and angle modulation (phase modulation, frequency modulation, etc.). A useful article describing phase jitter in relationship to noise has appeared in *Telephony*, Sept. 25, 1972, pages 43–52.

The relationship of a signal-to-nose ratio to phase jitter may be mathematically demonstrated. Assume a strong dominant sine wave component $A_1\cos\omega_i t$ of a signal at the output of a communication circuit under test. Assume further, for simplicity, that the communication circuit output includes only one additional sine wave component $A_2\cos\omega_2 t$ whose magnitude is significantly less than that of the dominant component. The dominant component frequency $\omega_1$ will usually be equal to the test carrier frequency input to the communication circuit. The second component of the communication circuit output has a different frequency $\omega_2$, and represents unwanted noise. The second component introduces phase jitter to the dominant signal and the magnitude of phase jitter is related to the ratio $A_2/A_1$ which is the signal-to-noise ratio desired.

The communication circuit output signal for this assumed case is, $$a = A_1\cos\omega_1 t + A_2\cos\omega_2 t$$

Rearranging terms, performing a trigonometric expansion, converting into polar form, assuming $A_1$ is much greater than $A_2$, making use of Taylor's expansion and neglecting higher order terms in $A_2/A_1$, we get $$\phi \approx A_2/A_1 \sin(\omega_2 - \omega_1)t$$

where $\phi$ is a time varying function of a relative phase of the communication circuit output signal $a$.

The noise measuring technique of the present invention can also be utilized with great advantage to measure the dynamic frequency response of a communication circuit. It is pointed out in Bell System Technical Reference Publication 41008 (October 1971), pages 1 and 2, that it is difficult to make such a dynamic frequency response measurement, and therefore, an inferior static frequency response measurement is usually used. The dynamic measurement technique is especially desirable for communication circuits that include compandors. Such a dynamic frequency response is obtained of a communication circuit according to the present invention by observing the signal-to-noise ratio at its output in a manner discussed above while a strong fixed frequency sinusoidal carrier signal is inserted into the communication circuit input. A second low power sinusoidal signal is also connected to the input of the communication circuit and its frequency is varied over the frequency range of the circuit while the signal-to-noise measurement is observed. Such a technique according to the present invention permits a dynamic frequency response of a communication circuit to be obtained just as easily as existing techniques permit a static frequency response characteristic to be obtained.

Additional objects, advantages and features of the various aspects of the present invention will become apparent from the following detailed description which should be taken in conjunction with the accompanying drawings.

DESCRIPTION OF THE PREFERRED EMBODIMENT

Figure 1:
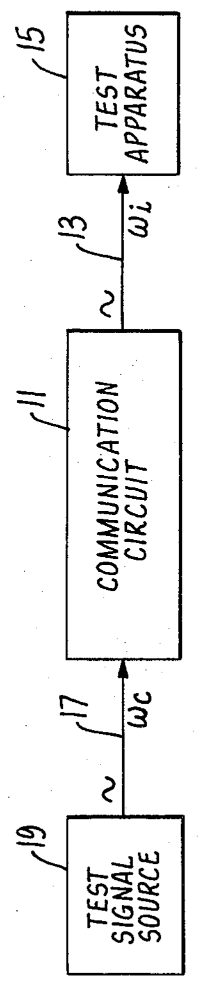
FIG. 1 schematically illustrates the general testing of a communication circuit.

Referring to FIG. 1 a communication circuit 11 under test is connected at its output 13 to a testing apparatus 15. At an input 17 to the communication circuit 11 is connected a test signal source 19 which may be one or more signal generators. The test apparatus 15 thereby observes a known test signal after it has passed through the communication circuit 11 and experienced distortion, angle modulation or the addition thereto of random or other sources of noise.

Figure 2:
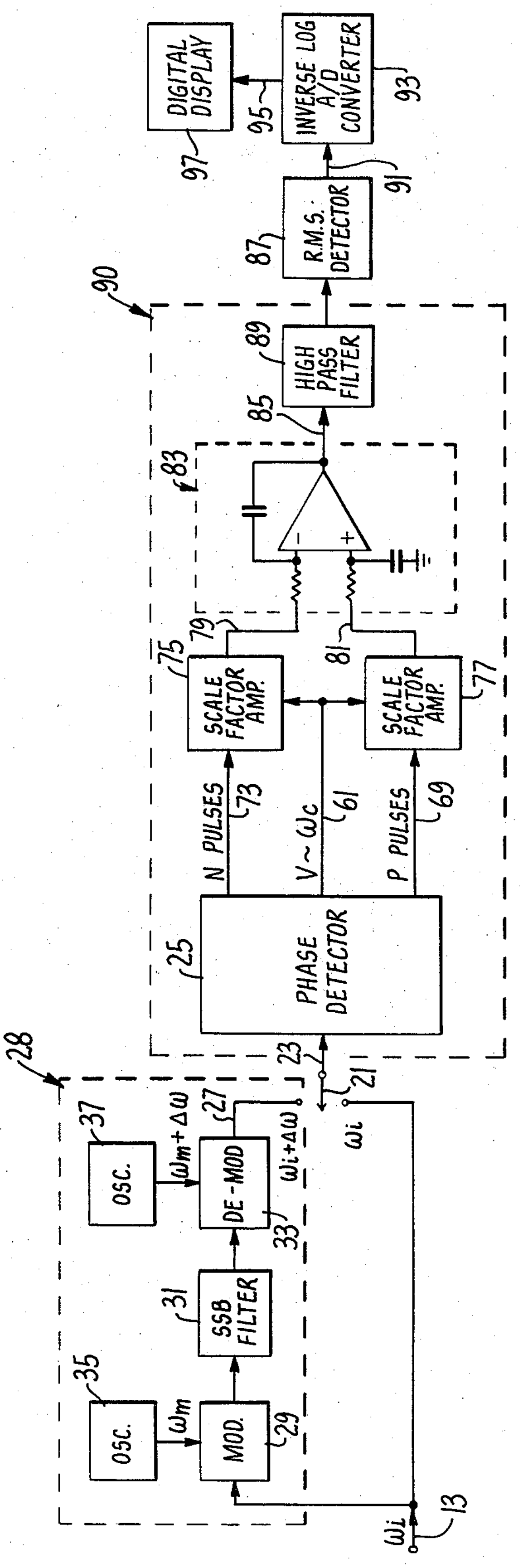
FIG. 2 schematically illustrates in block diagram form a signal-to-noise and harmonic distortion test apparatus according to the present invention.

A test apparatus 15 incorporating the various aspects of the present invention is illustrated with respect to FIG. 2. A selection switch 21 has an output 23 that is applied to a phase jitter detector 25. In a first position of the switch 21, its output 23 is connected directly with the signal input 13. This yields an indication of signal-to-noise with the exclusion of harmonics. In a second position of the switch 21, its output 23 is connected to a line 27 from a frequency shifting circuit. The frequency shifting circuit includes a first balanced modulator 29 receiving the input signal from the input line 13. The output of the modulator 29 is passed through a single sideband filter 31 to remove one of the two sidebands of the output of the modulator 29. The selected sideband is then applied to a balanced demodulator 33 whose output in the line 27 may be selected by the switch 21. The modulator 29 is driven by a first oscillator 35 that is preferably crystal controlled for precise non-drift selection of a modulating frequency. A second oscillator 37 in conjunction with the demodulator 33 has a frequency that is slightly different than that of the first oscillator 35. The output in the line 27 is thus the input frequency in the line 13 plus some incremental frequency shift amount equal to the difference in the frequencies of the oscillators 35 and 37. The modulator 29 and demodulator 33 are conveniently selected from commercially available double balanced suppressed carrier modulators.

The manual switch 21 is thus capable of selecting for application to the phase detector 23 either the input signal directly or one that has been shifted in frequency a small amount, for reasons discussed generally hereinbefore and which are discussed more specifically hereinafter. The phase detector 25 is illustrated in more detail in FIG. 3 and is of the same construction as described with respect to FIG. 3 of aforementioned copending patent application, Ser. No. 205,242, from which additional details of such a circuit may be obtained. A converter 39 accepts an incoming signal in the line 23 and converts it to a square-wave at an output 41. Since the circuit of FIG. 3 operates in response to zero crossings of the signal in the line 23, a square-wave makes it more convenient for detecting such zero crossings. A square-wave in the line 41 is simultaneously applied to two separate phase detectors 43 and 45. The first phase detector 43 compares the duration of each positive one-half cycle of the signal in the line 23 to the duration of a reference pulse. The reference pulse as developed in the phase detector 43 has a duration equal to an average length of all positive one-half cycles of the signal in the line 23 over a period of time. The second phase detector 45 compares the duration of each negative one-half cycle of the signal in the line 23 with another reference pulse generated therein that has a duration equal to an average length of all negative one-half cycles of the signal in the line 23.

Since the structure of the individual phase detectors 43 and 45 is substantially the same, the structure of only the detector 43 is explained. A one-shot multivibrator 47 is triggered by a zero crossing of the signal in the line 23 when that signal is going positive. An output of the multivibrator 47 in the line 49 is a square-wave pulse having a duration equal to an average length of all positive one-half cycles of the waveform in the line 23 over a predetermined period of time. This reference pulse in the line 49 is compared with the duration of each positive one-half cycle of the signal in the line 23 by an edge comparator 51. If a given one-half cycle of the signal in the line 23 is greater than the reference pulse in the line 49, the edge comparator 51 emits a pulse in a line 53 (labelled herein as the "P" type). The P pulse in the line 53 has a duration equal to the difference in duration of the one-half cycle of the signal in the line 23 and the reference pulse 49. Conversely, if a positive one-half cycle of the signal in the line 23 has a duration less than that of the reference pulse in the line 49, the edge comparator 51 emits a pulse in the line 55 (herein referred to as an "N" type pulse) having a duration equal to the time difference.

The duration of the reference pulse in the line 49 is controlled by a feedback loop including a differential integrator 57 which receives the P and N pulses from the lines 53 and 55 and a voltage-to-current converter 59 which is connected to the multivibrator 47 to control its output pulse width. The integrator 57 is heavily damped so that its output voltage that is applied to the voltage to current converter 59 is proportional to the average period of the signal in the line 23. This average period proportional voltage is also applied through a line 61 to the subsequent stages of the testing apparatus.

Figure 3:
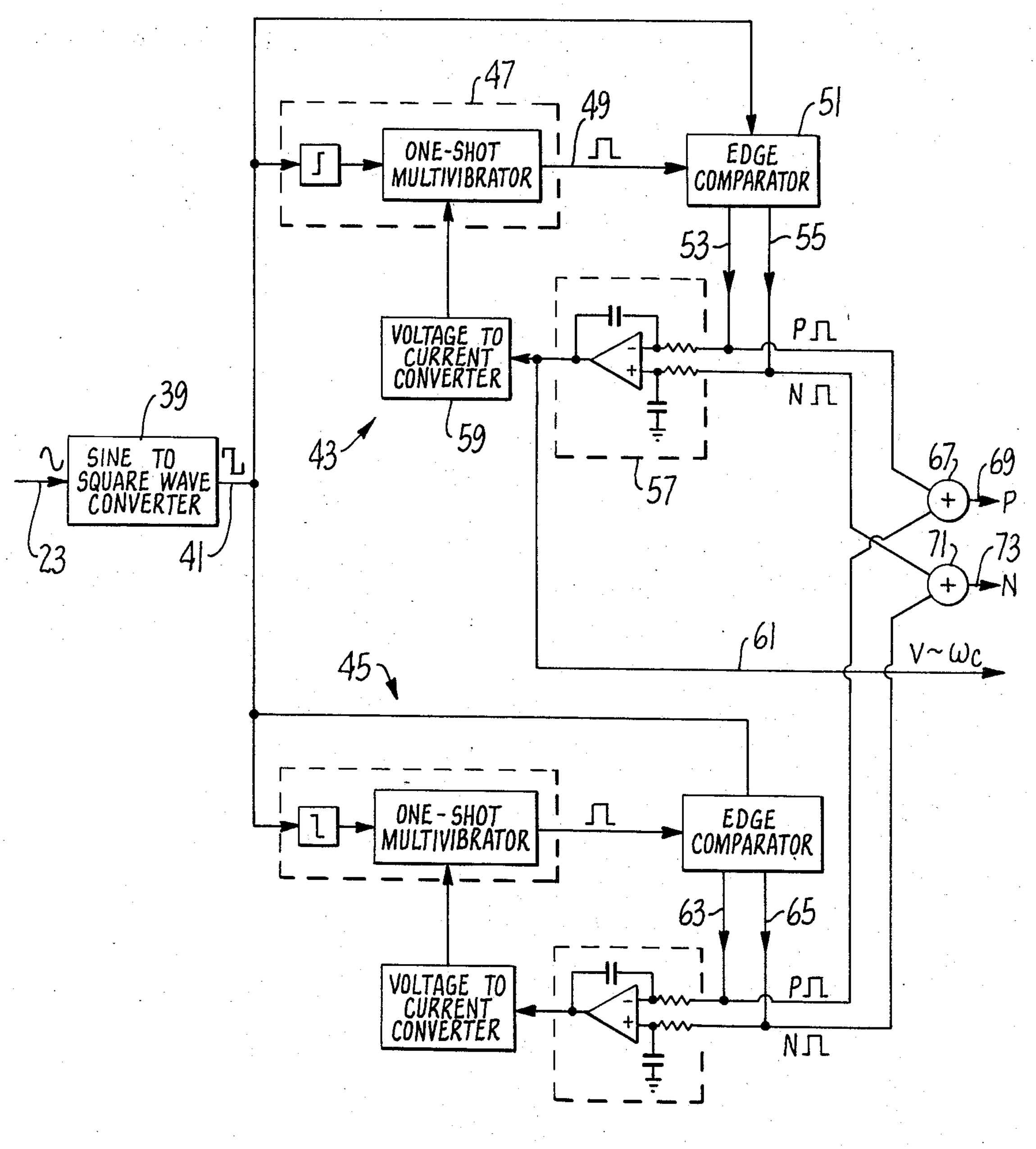
FIG. 3 schematically illustrates details of the phase detector block of the circuit of FIG. 2.
Figure 4:
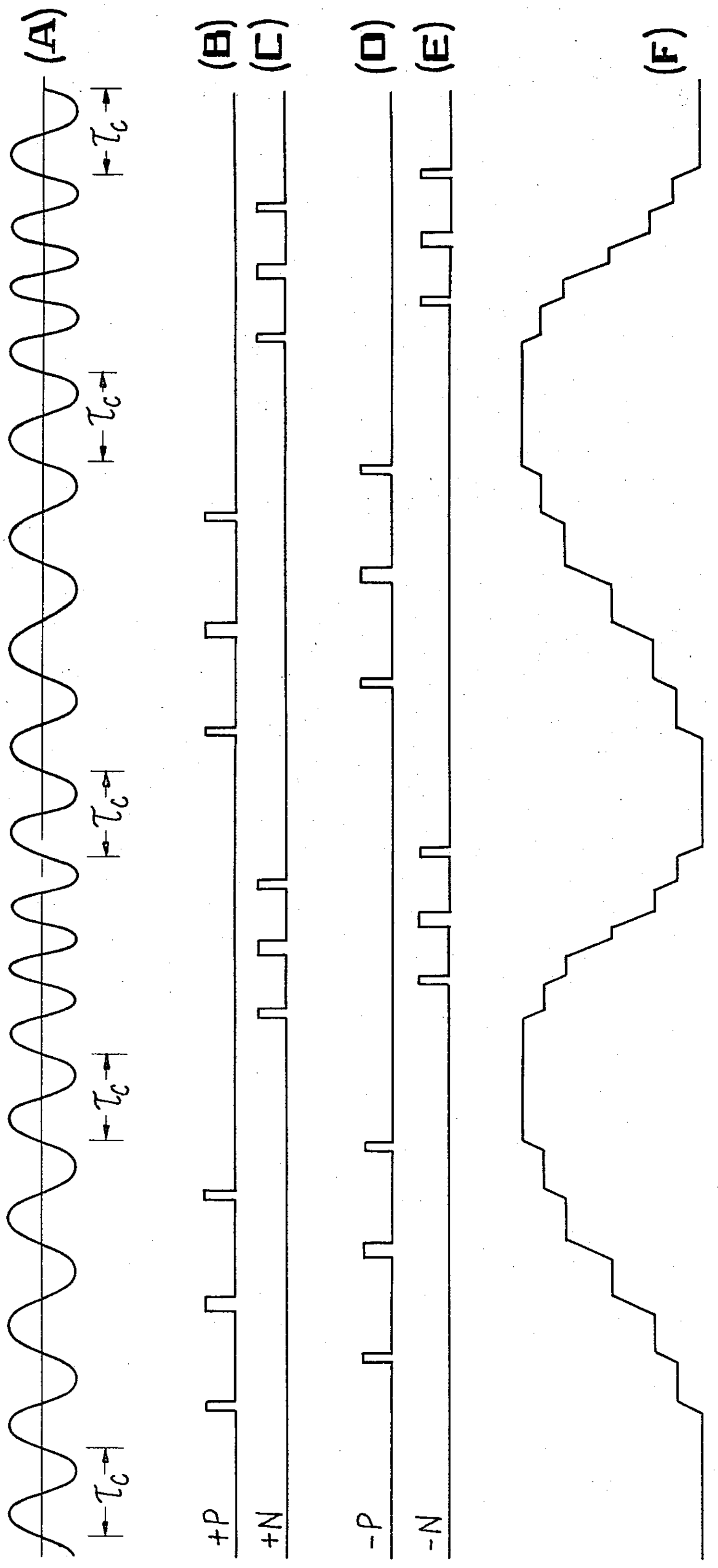
FIG. 4 is a plurality of sample waveforms at various points of the test apparatus according to FIGS. 2 and 3.

Referring to FIG. 4, an example of the waveforms generated in portions of FIGS. 2 and 3 is shown for an input waveform example in the line 23 according to FIG. 4(A). The example of FIG. 4(A) shows a carrier test signal of a single frequency having a period $\tau_c$ with a higher frequency signal of a lower level combined therewith. The result, as is apparent from FIG. 4(A), is a signal at the output of the communication circuit which has lost the periodicity of the zero crossings that is characteristic of the test carrier signal inputted to the communication circuit. For such a signal, FIG. 4(B) shows the P pulses generated in the line 53 of FIG. 3 and FIG. 4(C) shows the N pulses generated in the line 55 of FIG. 3.

The operation of the individual phase detector 45 is similar to that described with respect to the detector 43 except that the detector 45 is operating on the negative one-half cycles of a signal in the line 23. P type pulses are generated in a line 63 when a negative one-half cycle of the signal in the line 23 is greater than an average duration of a negative one-half cycle, as illustrated in FIG. 4(D). An N pulse is generated in the line 65 each time a negative one-half cycle of the signal in the line 23 has a duration that is less than an average negative one-half cycle duration, as shown in FIG. 4(E). The average one-half cycle duration pulses developed at the outputs of the multivibrators of the individual phase detectors 43 and 45 is equal to ½ $\tau_c$.

The P pulses of each of the individual phase detectors 43 and 45 are combined in an OR gate 67 to form a single output line 69. Similarly, the N pulses are combined by an OR gate 71 into a common output line 73.

The N and the P pulses in the line 73 and 69, respectively, of FIG. 2 are applied to separate scale factor amplifiers 75 and 77. The purpose of the amplifiers 75 and 77 is to control the magnitude of pulses in their output lines 79 and 81, respectively. Since the voltage applied to both of the amplifiers 75 and 77 through the line 61 is proportional to the average frequency (or to $\tau_c$) of the input signal in the line 23, the pulse magnitudes in the output lines 79 and 81 are adjusted by the average signal frequency. The duration of the pulses in the lines 79 and 81 is the same as that of the N and P pulses in the lines 73 and 69, respectively, which is fed by the differences between the duration of signal one-half cycles and that of an average one-half cycle. These amplitude adjusted pulses are then applied to the inputs of a differential integrator 83. Additional details of the scale factor amplifier 75 and 77 and the integrator 83 can be had by reference to the description in the aforementioned copending application, Ser. No. 205,242, and especially FIG. 7 thereof.

The waveform in an output line 85 of the differential integrator 83 is illustrated in FIG. 4(F) for the particular input signal in the line 23 that is shown in FIG. 4(A). Each time a modified P type pulse occurs in the line 81 of FIG. 2 (simultaneously with the P pulses of FIGS. 4(B) and 4(D) the output level in the line 85 increases an amount proportional to the duration of the pulse and to the voltage level in the line 61. This is apparent from FIG. 4(F). Conversely, each time a modified N type pulse occurs in the line 79 (occurring simultaneously with the N pulses of FIGS. 4(C) and 4(D)), the output level in the line 85 is driven downward. The result is the waveform of FIG. 4(F) which is an amplitude varying voltage function that varies in one direction when a given period of the signal is greater than an average period and in another direction when the period of the signal is less than such an average period. A use of the amplitude waveform of FIG. 4(F) in a prior phase jitter test set measures the total peak-to-peak phase jitter by noting the maximum voltage level variation in the signal of FIG. 4(F). It may be noted that the output in the line 85 changes during a P or N pulse and the slope of that change is determined by the voltage in the line 61 which is proportional to the average period of the signal under investigation. Therefore, the test apparatus being described accommodates automatically for a changing test signal frequency and need not be tuned. The test apparatus follows a changing test frequency. The amplitude variations of FIG. 4(F) can also be referred to as a cumulative phase jitter signal.

Rather than detect the peak-to-peak phase jitter from the signal in the line 85 illustrated in FIG. 4(F), the signal is passed to a true or quasi r.m.s. detector 87 through a high pass filter 89. A block 90, between the input to the phase detector 25 and the output of the high pass filter 89, is a phase jitter detector. The detector 87 receives the waveform as shown in FIG. 4(F) and develops at an output 91 a DC voltage that is proportional to the root-mean-square (r.m.s.) of the time varying signal in the line 85. The r.m.s. value of the signal of FIG. 4(F) is related to the peak-to-peak phase jitter in a known manner only for the special case illustrated where the input waveform in the line 13 is the result of mixing two sinusoidal signals. A true r.m.s. detector, as known in the art, may be utilized for a detector 87 but these are rather complicated devices. Therefore, a "quasi" r.m.s. detector circuit is preferable for simplicity since its output can be made to follow very closely that of the true r.m.s. detector. Such a quasi r.m.s. detector is described in the *Bell System Technical Journal* of July, 1960, pages 911–931. The DC signal level in the output 91 is proportional to the signal-to-noise ratio of the signal in the input line 23.

In order to express the signal-to-noise ratio in decibels directly, the DC level in the line 91 is applied to a circuit 93 that takes the inverse logarithm of the signal level in the line 91 and expresses this inverse logarithm in digital form in an output 95. The digital signal in the line 95 is displayed visually by some convenient digital display device 97. The signal-to-noise ratio of the signal in the line 23 is displayed in decibels. The inverse logarithm circuit 93 may include a capacitor that is charged by the signal 91 and a digital counter that advances during the time that the capacitor discharges to a predetermined level. It is this discharge time that is expressed digitally at the output 95.

Figure 5:
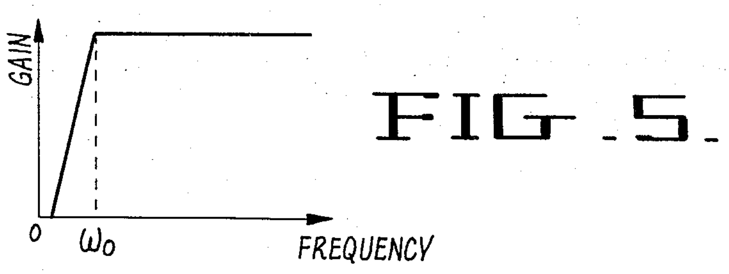
FIG. 5 shows a desired frequency characteristic curve of the high pass filter of FIG. 2.

The high pass filter 89 of FIG. 2 is made to have a characteristic curve of a type illustrated in FIG. 5. The cutoff frequency $\omega_o$ is chosen to be very small, perhaps anywhere from 1 to 20 hz. The filter 89 is constructed of existing components. It is a three pole filter having a slope between 0 and $\omega_o$ in frequency of 18 decibels per octave roll-off. This slope is controlled by the number of poles included in the filter.

Figure 6:
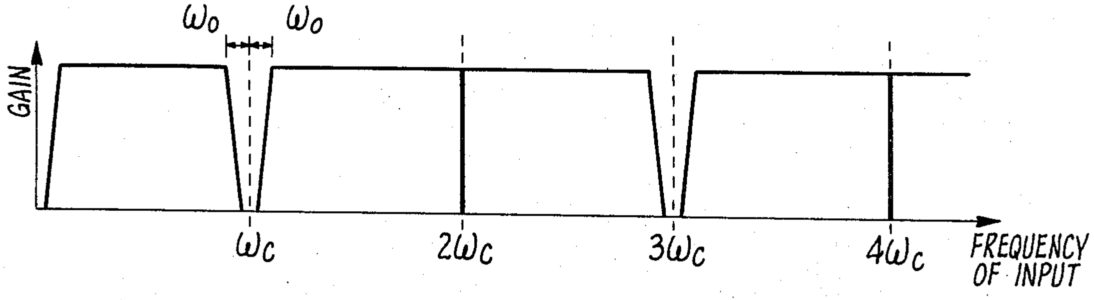
FIGS. 6 and 7 indicate frequency response curves of the test apparatus according to the present invention.

Referring to FIG. 6, a characteristic bandwidth curve is illustrated for a predominate test carrier signal of a single frequency $\omega_c$ being inserted into the input of the communication circuit under investigation. The output of the communication circuit will have a strong component at the test frequency $\omega_c$ and will also contain components of lesser strength at other frequencies that are caused by distortion, noise, angle modulation, etc., within the communication circuit. The test apparatus illustrated with respect to FIGS. 2 and 3 will detect no phase jitter when the output signal of the communication circuit is at a single frequency $\omega_c$. This is, obviously, because there is no irregular periodicity of the output signal zero crossings. The same condition occurs at the harmonics of the carrier frequency $\omega_c$. Therefore, the apparatus of FIGS. 2 and 3 automatically notches out the test frequency and its harmonics as illustrated in FIG. 6. As the test carrier frequency $\omega_c$ is changed by changing the frequency of the signal generator at the input of the communication circuit, the test apparatus of FIGS. 2 and 3 automatically follows that frequency to suppress it and its harmonics.

Such suppression of the carrier frequency and its harmonics occurs without the high pass filter 89. However, the width of such suppression notches without the filter 89 are in the order of less than 1 hz. In order to form such notches into a controlled width wider than this, the high pass filter 89 is employed with the results illustrated in FIG. 6. At the carrier frequency $\omega_c$, the notch is $2\omega_o$ wide at its top with a slope controlled by the characteristic slope of the filter 89 as described with respect to FIG. 5. The same wide notch appears at the odd harmonics while the narrow notch appears at the even harmonics. The notch about the carrier frequency fundamental $\omega_c$ is the average frequency of the test input signal $\omega_i$ applied to the line 13 from the output of the communication circuit. The carrier frequency $\omega_c$ is usually the frequency of a signal generator that is the test signal source 19 at the input of a communication circuit.

Figure 7:
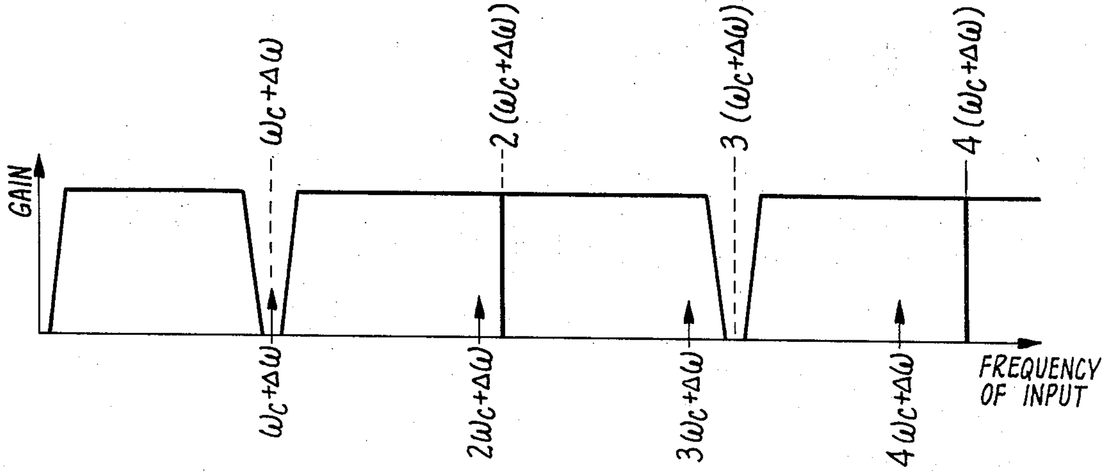

The characteristic of FIG. 6 is that of the test set illustrated in FIGS. 2 and 3 when the switch 21 is in its position connecting the line 23 directly with the input line 13. Any harmonic distortion contributed by the communication circuit under investigation will not appear as part of the noise in the output signal-to-noise measurement since the harmonics of the carrier frequency $\omega_c$ are all suppressed. Therefore, the input frequency shifting circuit including the modulators 29 and 33 are provided so that the user of the test apparatus may select to shift the frequency of the communication circuit output by moving the switch 21 to complete his circuit with the line 27. In this second position, the characteristic of the test apparatus is that shown in FIG. 7. The carrier frequency $\omega_c$ as viewed by the test apparatus has been shifted an incremental amount $\Delta\omega$. The test apparatus now sees the quantity $\omega_c + \Delta\omega$ as the carrier frequency and notches out this as well as integral multiples of this quantity, as shown in FIG. 7. The output of the communication circuit 11, however, has the incremental frequency quantity $\Delta\omega$ added to all components of the input signal from the output of the communication circuit under test. Therefore, the various harmonics of the test signal carrier frequency $\omega_c$ do not occur within the projected notches, as shown in FIG. 7. This results in any harmonics of the carrier frequency that may be generated in a communication circuit 11 to be read as part of the noise in the output signal-to-noise ratio. The capability of making a signal-to-noise reading with the carrier harmonics both suppressed and a separate reading when they are not suppressed is a very useful diagnostic feature. This permits determining the component of noise, that is the result of harmonic distortion within the communication circuit 11 by observing any differences in the signal-to-noise output reading as the switch 21 is moved between its two positions.

Figure 8:
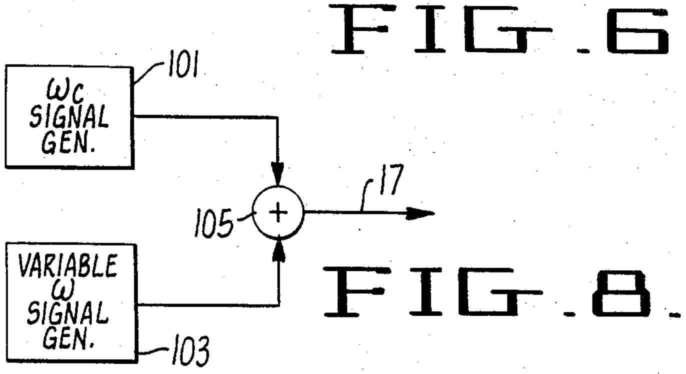
FIG. 8 schematically illustrates in block diagram form a signal source for using the test apparatus according to FIGS. 2 and 3 for obtaining dynamic frequency response characteristics of a communication circuit.

The test apparatus of FIGS. 2 and 3 can also be used to determine a dynamic frequency response characteristic of a communication circuit 11. The test signal source 19 of FIG. 1 is made to include two signal generators as illustrated in FIG. 8. A first signal generator 101 is held at a single carrier frequency $\omega_c$. A second signal generator 103 has its output mixed with the output of the signal generator 101 in an appropriate mixer circuit 105 so that both signals are presented to the input 17 of the communication circuit 11. The signal level of the output of the second signal generator 103 is made to be less than the output of the carrier frequency signal generator 101, perhaps 20 decibels therebelow. Any compandors or other similar gain controlling elements within the communication circuit 11 respond to the strong carrier signal $\omega_c$ from the signal generator 101 and set the gain of the circuit. The frequency of the signal generator 103 is then varied across the range of the communication circuit and the output signal-to-noise reading in the display 97 is noted as a function of the signal generator 103 frequency. A response so obtained is the dynamic frequency response of the communication circuit 11. The output of the signal generator 101 is automatically suppressed by the test apparatus of FIGS. 2 and 3 no matter what its frequency and it even follows that frequency if it happens to be changed. There is no complicated filtering scheme for removing the carrier frequency from the output of the communication circuit but rather that happens automatically with the test apparatus of FIGS. 2 and 3.

It will be noted from FIGS. 6 and 7 that the frequency response of the test apparatus according to the present invention is practically unlimited. However, if only specific frequency ranges are desired to be investigated as an aid in diagnosing the source of undesirable noise, a low pass filter could be inserted into the circuit of FIG. 2 between the high pass filter 89 and the detector 87. Alternatively, conventional tuned filter circuits could be employed at the input of the testing device in the line 13.

It will be understood that although the various aspects of the present invention have been described with respect to specific examples thereof, the invention is entitled to protection within the full scope of appended claims.

We claim:

1. A method of analyzing a desired signal plus noise, comprising the steps of:

forming from said desired signal plus noise a function having an amplitude that varies in one direction in response to a period of said signal plus noise being greater than an average period thereof over a large number of cycles and varies in an opposite direction in response to a period of said signal plus noise being less than said average period, and detecting said function to form a test signal that is substantially a r.m.s. value of said varying amplitude function, whereby said r.m.s. signal is an indication of the signal-to-noise ratio of said desired signal plus noise.

2. The method of claim 1 which includes the further step of making an inverse log conversion of said r.m.s. signal, whereby a desired signal-to-noise ratio may be expressed directly in decibels.

3. A method of measuring harmonic distortion of an input comprising the steps of:

shifting the input signal an incremental frequency, forming from the frequency shifted input signal a function having an amplitude that varies in one direction in response to a period of said frequency shifted signal being greater than an average period thereof over a large number of cycles and varies in an opposite direction in response to a period of said frequency shifted signal being less than said average period, and detecting said function to form a test signal that is substantially a r.m.s. value of said varying amplitude function, whereby said r.m.s. signal is an indication of the harmonic distortion of the input signal.

4. A method of testing a communication circuit, comprising the steps of:

inserting a single frequency sinusoidal test signal into an input of said communication circuit, receiving said test signal at an output of said communication circuit in the form of the test signal plus noise, forming from said test signal plus noise a function having an amplitude that varies in one direction in response to a period of said test signal plus noise that is greater than an average period thereof over a number of cycles and which varies in an opposite direction in response to a period of said test signal plus noise that is less than said average period, detecting said function to form a direct current signal that is substantially an r.m.s. value of said varying amplitude function, and taking an inverse logarithm function of said direct current signal in order to form an output signal that is directly related to a signal-to-noise ratio in decibels.

5. The method according to claim 4 which includes an additional step of shifting the frequency of said received test signal plus noise an incremental amount prior to the step of forming said varying amplitude function, thereby to restore harmonics of said test signal into the measurement of a signal-to-noise ratio.

6. A method of determining a dynamic frequency response of a communication circuit, comprising the steps of:

inserting a first test signal of a single frequency into input of said communication circuit, inserting a second test signal of a single frequency into the input of said communication circuit, said second signal having substantially a lower power level than said first signal, forming a function from a signal output of the communication circuit that has an amplitude which varies in one direction in response to a period of said output signal being greater than an average period of a plurality of said output signal period and in an opposite direction in response to the period of the output signal being less than said average period, detecting said function to form a signal that is substantially an r.m.s. value of said varying amplitude function, varying the frequency of said second signal at the input of the communication circuit over the frequency range of said circuit, and observing changes in the value of said r.m.s. signal, whereby variations in frequency response of the communication circuit over its range may be detected.

7. A communication circuit test set, comprising:

means receiving an input signal plus noise for forming therefrom a function having an amplitude that varies in one direction in response to the period of said input signal plus noise being greater than an average period of a large number of cycles thereof and varying in an opposite direction in response to the period of said input signal plus noise being less than said average period, means for detecting substantially a r.m.s. value of said amplitude varying function, means receiving said r.m.s. value signal for making a logarithmic conversion thereof, and means receiving said logarithmic conversion for indicating its value, whereby said value is the signal-to-noise ratio of said input signal expressed in decibels.

8. A communication circuit test set for measuring harmonic distortion of an input signal, comprising:

means receiving the input signal for shifting its frequency an incremental amount, means receiving the frequency shifted input signal for forming therefrom a function having an amplitude that varies in one direction in response to the period of said frequency shifted input signal being greater than an average period of a large number of cycles thereof and varying in an opposite direction in response to the period of said frequency shifted input signal being less than said average period, means for detecting substantially a r.m.s. value of said amplitude varying function, means receiving said r.m.s. value signal for making a logarithmic conversion thereof, and means receiving said logarithmic conversion for indicating its value, whereby said value is a measure of the harmonic distortion of said input signal.

9. A test set according to claim 7 wherein said amplitude function forming means comprises:

means responsive to an input test signal for determining a time difference between each positive one-half cycle of said input signal and an average one-half positive cycle thereof, means responsive to an input test signal for determining a time difference between each negative one-half cycle of said input signal and an average one-half negative cycle thereof, accumulating means responsive to said positive and negative time determining means for driving an output in one direction when a one-half cycle exceeds said average time duration and in an opposite direction when a one-half cycle is less than said average time duration, the amount that the output is driven being directly proportional to said time duration differences, and said average period, thereby to form said amplitude varying function.

10. A test set according to claim 7 which additionally comprises a high pass filter inserted between said varying amplitude forming means and said detecting means.

11. A communication circuit test set, comprising:

means connected to an input for shifting an input signal a predetermined frequency, means for selecting either a frequency shifted input signal or the input signal from the input directly to form a selected output signal, means receiving said selected output signal for detecting the phase of said selected output, said receiving means including:

means for determining a time difference between each period of said signal and an average period of a plurality of cycles of said signal, and means responsive to said time determining means for accumulating the amounts of said time differences exceeding the average period being given one sign and those differences of a period of the test signal less than said average period being given an opposite sign, thereby to form a time varying function, and means receiving said time varying function for substantially r.m.s. detecting said function, thereby to generate an output signal that is proportional to the signal-to-noise ratio of said input signal.

12. A test set according to claim 11 wherein said frequency shifting means includes:

a first modulator connected to receive said input signal, a first single frequency oscillator connected to said first modulator to form a modulated output thereof, a single sideband filter selecting one sideband of said first modulator output, a second modulator connected to receive the single sideband output of said filter for demodulating said output, and a second single frequency oscillator having a frequency slightly different than that of said first oscillator to form a demodulated output at said second modulator, said demodulated output being the test signal shifted in frequency an amount equal to the difference in frequency of said first and second oscillators.

* * * * *